United States Patent Office 2,840,548
Patented June 24, 1958

2,840,548
POLYMERIC REACTION PRODUCTS OF UNSATURATED DILACTONES AND COMPLEMENTARY POLYFUNCTIONAL REACTANTS

Benjamin W. Howk, West Chester, Pa., and John C. Sauer, Wilmington, Del., assignors to E. I. du Pont de Nemours and Company, Wilmington, Del., a corporation of Delaware No Drawing. Application November 25, 1955
Serial No. 549,153

15 Claims. (Cl. 260—78.3)

This invention relates to new polymeric compositions and to their preparation. More particularly, this invention relates to new polymeric reaction products of certain unsaturated dilactones and complementary polyfunctional reactants.

New unsaturated dilactones are obtained when acetylenes are reacted with carbon monoxide in the presence of a catalytic amount of a cobalt carbonyl. These new unsaturated dilactones and their preparation are the subject matter of the copending patent application of J. C. Sauer, Ser. No. 432,599, filed May 26, 1954, now abandoned and continuation-in-part patent application thereof Ser. No. 549,155, filed Nov. 25, 1955. These new unsaturated dilactones correspond in composition to $C_8(RR')_2O_4$, wherein R and R' are hydrogen, haloaryl, alkoxyaryl, or hydrocarbon free from non-aromatic unsaturation, and show strong absorption lines in the ultraviolet spectra in the region of 3300–4400 A., and yield suberic acids on hydrogenation over platinum in acetic acid.

It is an object of this invention to provide new polymeric compositions and methods for their preparation. A further object is to provide new polymeric reaction products of certain unsaturated dilactones and complementary polyfunctional reactants. A still further object is to provide new polymers possessing thermosetting properties. Another object is to provide polymeric products which are useful in coating compositions and as components of printing inks. Other objects will appear hereinafter.

These and other objects of this invention are accomplished by providing polymers of an unsaturated dilactone and a complementary polyfunctional reactant containing at least two groups which are reactive toward carboxyl, the unsaturated dilactone corresponding to $C_8(RR')_2O_4$, wherein R and R' are hydrogen, haloaryl, alkoxyaryl or hydrocarbon radicals free from non-aromatic unsaturation. It has been discovered that if these dilactones are reacted with a complementary polyfunctional reactant containing at least two groups which are reactive toward carboxyl there are obtained new polymers possessing thermosetting properties.

The dilactones employed in this invention correspond to the formula $C_8(RR')_2O_4$, wherein R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing less than 7 carbon atoms, aryl, especially where the aryl radical is hydrocarbon of not more than 10 carbon atoms, aralkyl, especially of not more than 7 carbons, or cycloalkyl, particularly of not more than 7 carbon atoms. Examples of such radicals are methyl, ethyl, octyl, decyl, dodecyl, phenyl, tolyl, xylyl, benzyl, cyclohexyl, naphthyl, methylcyclohexyl, methoxyphenyl, ethoxyphenyl, decyloxyphenyl, dodecyloxyphenyl, dodecyloxynaphthyl, chlorophenyl, chloronaphthyl, and the like. These dilactones show strong absorption lines in the ultraviolet spectra in the region of 3300–4400 A. and yield suberic acids on hydrogenation over platinum in acetic acid.

These dilactones can be position isomers corresponding to the cis and trans forms of

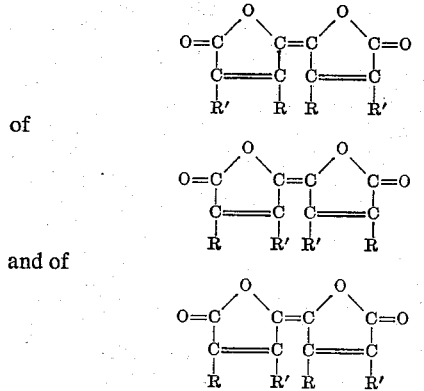

and of wherein R and R' are defined as aforesaid. These unsaturated dilactones can be represented by the general formulas

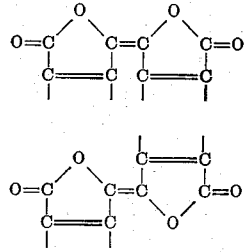

and

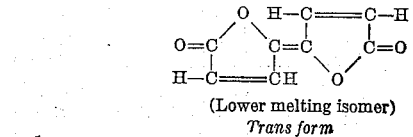

wherein one free valence of each ring is satisfied by R and the other free valences of said rings are satisfied by R', said R and R' being defined as aforesaid.

The dilactone from acetylene and carbon monoxide is $[\Delta^{2,2'(5H,5'H)}$-bifuran]-5,5'-dione corresponding in formula to $C_8H_4O_4$ and exists in two structural isomeric forms, a trans and a cis form, as follows:

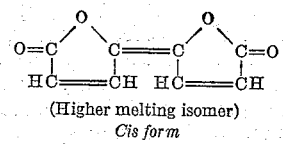

(Lower melting isomer)
Trans form and (Higher melting isomer)
Cis form

The lower melting isomer has a melting point of 230–237° C. and the higher melting isomer has a melting point of 240–248° C., determined in a capillary tube in an electrically heated melting point apparatus. The isomers can be recrystallized repeatedly from methyl ethyl ketone to give samples melting at 235° and 247° C., respectively, when a setting is used such that the temperature increases from 175–200° C. in 6 minutes, from 200–225° C. in 9 minutes, and from 225–247° C. in 11 minutes.

The melting is generally accompanied by sublimation and decomposition. The two isomers are further distinguished by their ultraviolet absorption. The lower melting isomer has its maximum absorption at about 3400 A., and its specific absorbance, $k_{3400\ A.}$ is 200–204. The higher melting isomer has its maximum absorption at about 3340 A. and its specific absorbance, $k_{3340\ A.}$ is 220–224. Thus the ultraviolet specific absorbance for the $C_8H_4O_4$ compound is from 200 to 224.

On the basis of the infrared spectra, the lower melting isomer is assigned the trans configuration and the higher melting isomer is assigned the cis configuration. The selection of the cis structure for the high melting isomer rests primarily on the infrared absorption peaks at $6.0\mu$ and $6.5\mu$ (doublet) in the conjugated unsaturation region. The intense band at $6.0\mu$ which is virtually absent for the low melting isomer, is due to the bridge double bond. In the trans structures, this double bond is astride a center of symmetry and will not absorb. The cis structure has no center of symmetry and the central double bond will absorb. The doublet at $6.5\mu$ in the spectra of the high melting form is due to the ethylenic double bond of each ring. The low melting form shows only a single peak at $6.5\mu$ and this is consistent with a trans structure having a center of symmetry.

The complementary functional reactant is one which contains at least two groups which are reactive toward carboxyl, e. g., hydroxyl or amino containing at least one hydrogen attached to amino-nitrogen, i. e., primary or secondary amino groups. Preferred reactants are those which contain a plurality of amino or hydroxyl groups or both as the sole functional groups, particularly where these amino and hydroxyl groups are separated by a hydrocarbon chain. These complementary reactants may be monomeric or polymeric and include polyamines and polyhydroxy compounds. Examples of monomeric complementary reactants are ethylene, propylene, butylene, and octamethylene glycols, diethylene glycol, glycerol, erythritol, and pentaerythritol, glycidol, sorbitol and mannitol, glycerol-α-monochlorohydrin, aminoethanol, 4-aminobutanol-1, ethylenediamine, hexamethylenediamine, octamethylenediamine, 1,4-diaminocyclohexane, bis(4-aminocyclohexane), bis(4-aminocyclohexyl)methane, piperazine, and the like. Polymeric complementary reactants include polyvinyl alcohol, reduced acrylonitrile polymers and copolymers, reductively aminated ethylene/carbon monoxide copolymers, reduced nitrostyrene/butadiene copolymers, aminated glycidyl acrylate and methacrylate polymers and copolymers, reduced poly(3-pentenenitrile), reduced poly(nitrostyrene), reduced nitrated butadiene/styrene copolymers, reductively aminated vinyl ketone polymers and copolymers, and the like.

In practice, the polymers of this invention are obtained by bringing into intimate contact the dilactone and complementary reactant at a temperature within the range of 20° to 250° C.

Another convenient way for preparing the polymers of this invention is by reacting the dilactone and complementary reactant in a common inert organic solvent. When the reaction has proceeded to the desired stage, the solution can be used as such or the polymer may be separated from the solvent by drowning in a non-solvent, or by removing the solvent by distillation, preferably under reduced pressure. Still another way is by interfacial polymerization in which the reactants are each dissolved in liquids which are mutually immiscible and the mixture is then agitated at temperatures which may be below or above normal room temperature until the desired reaction has occurred.

The examples which follow are submitted to illustrate and not to limit this invention.

*Example I*

A glass tube was charged with 1.94 g. of piperazine hexahydrate and 1.64 g. of the dilactone, $[\Delta^{2,2'(5H,5'H)}$-bifuran]-5,5'-dione prepared as described subsequently. The tube was then evacuated to 1 mm. pressure and sealed. The tube was heated at 190° C. for 6 hours, cooled, opened, and then heated at 200° C. in a vacuum of 1–2 mm. for 6 hours. The polymeric product was a friable brown solid, insoluble in xylene, dimethylformamide, methyl ethyl ketone, phenol-trichlorophenol mixture, etc.

The dilactone used in the above example was prepared as follows:

Into a 400-ml. steel reactor was charged 26 g. of acetylene, 200 ml. of acetone, and 1.5 g. of dicobalt octacarbonyl. The mixture was heated at 100° C. with carbon monoxide at a pressure of 1000 atmospheres for 14 to 17 hours. The product was filtered and the brown solid was extracted with ethyl acetate for 24 hours. The extract was permitted to crystallize and the crystalline material which separatet was dried at room temperature. There was obtained 20 g. of a compound which by analysis corresponds to $C_8H_4O_4$, and whose structure is $[\Delta^{2,2'(5H,5'H)}$-bifuran]-5,5'-dione.

*Example II*

Five-tenths of a gram of the dilactone of Example I was mixed with 0.5 g. of tetraethylenepentamine at room temperature. Considerable heat was evolved. The product obtained was an infusible polymer which was insoluble in hydrocarbons, ketones, esters, etc.

*Example III*

A mixture of 0.49 g. of the dilactone of Example I and 0.21 g. of diethanolamine to which one drop of tetraethylenepentamine had been added became a pasty polymeric solid at room temperature. A small amount of carbon black was added to this paste and the pigmented composition smeared over paper. The coating on the paper became tack-free when heated on a mandrel at 168° C. in a maximum of 5 seconds exposure time. When a commercial printing ink paste was used for a control under these conditions, it was still tacky.

The advantages of the above printing ink are two-fold: (a) no solvent is required, and (b) the ink is tack-free after a short baking period at a lower temperature than a typical commercial printing paste.

*Example IV*

An intimate mixture of 1.64 g. of the dilactone of Example I with 0.78 g. of pentaerythritol was heated in a Carver press under 1500 lb./sq. in. pressure at temperatures varying from 140° to 200° C. A portion of the mixture which had been heated at 170° C. in the Carver press was examined for thermosetting properties. This mixture initially flowed between the platens of the press into a film; however, within 2 to 3 minutes, the film became rigid and would not flow thenceforth. Thus, the thermoplastic polymer, formed by interaction of the dilactone with the pentaerythritol, was quickly converted into a cross-linked thermoset polymer, which no longer exhibited flow under heat and pressure.

The product analyzed as follows:

*Analysis.*—Calc'd. for $C_{22}H_{22}O_{13}$: C, 53.40%; H, 4.40%. Found: C, 53.84; H, 4.13.

*Example V*

A heavy paste was made by mixing together 2.46 g. of the dilactone of Example I with 1.05 g. of diethanolamine. The paste was placed in a Carver press and heated at 150° C. and 1500 lb./sq. in. for 10 minutes. The resulting 3 mil thick sheet was homogeneous and was unaffected by contact with such common organic solvents as xylene, dimethylformamide, methylethyl ketone, dibutyl sebacate, etc.

*Example VI*

To an intimate mixture of 1.64 g. of the dilactone of Example I and 0.88 g. of polyvinyl alcohol there was added 10 ml. of cyclohexanone and the mixture refluxed for one hour. The solution was then evacuated at 100° C. and 200–300 mm. pressure for 24 hours. The resulting polymeric product was not soluble in water and weighed 2.4 g.

*Example VII*

A paste made from 2.46 g. of the dilactone of Example I, 1.05 g. of diethanolamine and two drops of tetraethylenepentamine was pressed at 150° C. and 1500 lb./sq. in. pressure for 10 minute. The film was 3 mils thick and in a second heat treatment under the same conditions showed no flow.

A 3-mil film was made into a 4-ply film of 12 mils in thickness and the composite heated at 150° C. in a Carver press. Although 3-mil shims were used, this 4-ply film originally of 12 mils thickness dropped only to 9 mils and then stopped flowing entirely.

A portion of the paste prepared as above was heated in a Carver press at 200° C. Under these conditions the film obtained showed no flow under pressure, indicating that the polymer had thermoset.

The product obtained by reacting the dilactone with diethanolamine in the presence of tetraethylenepentamine analyzed as follows:

*Analysis.*—Calc'd. for $C_8H_4O_4:C_4H_{11}O_2N(C_{12}H_{15}O_6N)$ (i. e., 1 mole of dilactone+1 mole of diethanolamine, ignoring the pentamine): C, 56.90%; H, 5.92%; H, 5.53%. Found: C, 57.11%; H, 5.73%; N, 5.78%.

*Example VIII*

One gram of the dilactone of Example I and 1 g. of 1,1,4,4-tetramethyltetramethylenediamine were intimately mixed and the mixture was then diluted with a small amount of xylene. The mixture was heated at 50° to 60° C. to effect solution, the heated solution was spread over a steel plate, and the plate was then baked for one hour at 100° C. The resulting coating of polyamide was hard and tack-free.

*Example IX*

Molar equivalents of the dilactone of Example I and hexamethylenediamine were dissolved in dioxane at room temperature. An exothermic reaction ensued immediately and a solid material precipitated. The product obtained analyzed for the 1,1 adduct of the dilactone with hexamethylenediamine, plus one mole of water.

*Analysis.*—Calc'd. for $C_{14}H_{22}O_5N_2$: C, 56.36; H, 7.43; N, 9.39. Found: C, 57.86, 57.55; H, 7.78, 7.60; N, 9.37, 9.49.

*Example X*

To 190 ml. of ethylene glycol there was added 8.2 grams of the dilactone of Example I in a flask fitted with a reflux condenser, gas inlet tube, and stirrer, and the mixture heated at reflux, with gaseous HCl being continuously bubbled through the refluxing mixture. After 6 hours at reflux the addition of HCl was stopped and approximately one half of the ethylene glycol removed by distillation at atmospheric pressure. Thereafter, the temperature was adjusted to between 190° and 200° C. and a catalytic amount of litharge was added to the reaction mixture. Heating, with continuous removal of volatile reaction products, was continued for about 3 hours, during which time the pressure was gradually reduced to 0.7 mm. to maintain the temperature at 190° to 200° C. The polymer obtained was a rubbery solid, insoluble in solvent for the dilactone and ethylene glycol.

*Example XI*

Into a 250 ml. flask there were added 8.2 g. of the dilactone of Example I, 100 ml. of dioxane, and 5.7 g. of 2,5-dimethylpiperazine. The mixture was heated to reflux with stirring for 1 hour. Thereafter the reaction mixture was allowed to cool to room temperature and the cold product separated by filtration. There were obtained 14 g. of black polymeric material which was soluble in dilute ammonium hydroxide. The product analyzed as follows:

*Analysis.*—Calc'd. for $C_{14}H_{18}N_2O_4$: C, 60.43%; H, 6.5%; N, 10.08%. Found: C, 57.13%, 57.03%; H, 6.67%, 7.10%; N, 8.68%, 8.53%.

The dilactones used in preparing the polymers of this invention are the products disclosed and claimed in the copending patent application of J. C. Sauer, U. S. Ser. No. 432,599, filed May 26, 1954, now abandoned, and continuation-in-part patent application thereof Ser. No. 549,155 filed Nov. 25, 1955. Chemically they are formed by the reaction of two moles of an acetylene of the formula R—C≡C—R' with four moles of carbon monoxide. The product from acetylene and carbon monoxide is [$\Delta^{2,2'(5H,5'H)}$-bifuran]-5,5'-dione.

These dilactones are obtained by reacting an acetylene with carbon monoxide in an inert organic solvent in the presence of a cobalt carbonyl catalyst. In one method of operation, a pressure reactor is charged with an inert organic solvent and a catalytic amount of a cobalt carbonyl catalyst, the reactor is closed, cooled to 0° C., or lower, and evacuated. A predetermined amount of acetylene is then admitted from a storage vessel calibrated so that the amount of acetylene delivered is measured by the drop in pressure, and the reactor placed in a shaking device. Carbon monoxide is introduced to between 50 and 3000 atmospheres and the charge heated and agitated at 80 to 175° C. These conditions are maintained until there is no further reaction, as evidenced by cessation of pressure drop. Throughout the reaction period the pressure within the reactor is maintained within the desired limits by periodic injections of carbon monoxide.

After reaction is complete the reactor is permitted to cool, unreacted acetylene and carbon monoxide are vented to the atmosphere, and the reaction mixture slurried with an inert organic solvent. The slurry is filtered and the residue on the filter extracted with a hot inert organic solvent. The extract is cooled and the crystalline product which separates is filtered and dried.

The acetylenes used in preparing these dilactones correspond to R—C≡C—R', wherein R and R' are hydrogen, alkoxyaryl, especially where the alkoxy radical is not more than 12 carbon atoms and the aryl radical is hydrocarbon of not more than 10 carbon atoms, haloaryl, especially chloroaryl where the aryl radical is hydrocarbon of not more than 10 carbon atoms, or monovalent hydrocarbon radicals which are free from non-aromatic unsaturation, especially of not more than 12 carbon atoms, e. g., alkyl, especially short chain alkyl, i. e., containing less than seven carbon atoms, aryl, especially where the aryl radical is hydrocarbon of not more than 10 carbon atoms, aralkyl, especially of not more than seven carbons, or cycloalkyl, particularly of not more than seven carbon atoms. Examples of such radicals are methyl, ethyl, octyl, decyl, dodecyl, phenyl, tolyl, xylyl, naphthyl, benzyl, cyclohexyl, methylcyclohexyl, chlorophenyl, chloronaphthyl, methoxyphenyl, ethoxyphenyl, decyloxyphenyl, dodecyloxyphenyl, dodecyloxynaphthyl, and the like. Examples of such acetylenes are acetylene, methyl acetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, etc.

By employing such substituted acetylenes in preparing the dilactones $C_8(RR')_2O_4$, the radicals R and R' will correspond to the substituents attached to the triply bonded carbon atoms in the acetylene reactant, i. e., R and R' in R—C≡C—R'. Thus, as shown by said Sauer continuation-in-part application, Serial No. 549,155, filed Nov. 25, 1955, there are prepared the dilactones:

[$\Delta^{2,2'(5H,5'H)}$-bi(phenylfuran)]-5,5'-dione
[$\Delta^{2,2'(5H,5'H)}$-bi(diethylfuran)]-5,5'-dione

[Δ²,²'(5H,5'H)-bi(n-butylfuran)]-5,5'-dione
[Δ²,²'(5H,5'H)-bi(β-naphthylfuran)]-5,5'-dione
[Δ²,²'(5H,5'H)-bi(chlorophenylfuran)]-5,5'-dione
[Δ²,²'(5H,5'H)-bi(o-methoxyphenylfuran)]-5,5'-dione
and the like.

The reaction between the acetylene and carbon monoxide is carried out batchwise or continuously in the presence of an inert organic liquid medium. By "inert organic liquid medium," as used herein, is meant organic liquids which contain no active hydrogen, as determined by the Zerewitinoff method [Ber. 40, 2026 (1927); J. Am. Chem. Soc. 49, 3181 (1927)]. Thus, the acetylene is the only compound in the reaction system which may contain active hydrogen. Specific inert organic liquids are isooctane, toluene, acetonitrile, acetone, ethyl acetate, dioxane, diethyl ether, xylene, benzene, etc. The nitriles and ketones are in general preferred over the hydrocarbons and ethers.

In the formation of the dilactones, there are actually involved 2 moles of an acetylene and 4 moles of carbon monoxide. In practice, this ratio is attained by charging a weighed sample of the acetylene into the reactor and then injecting carbon monoxide in amount sufficient to provide 2 moles thereof per mole of acetylene. Employing a 400 ml. reactor and 25–30 g. of acetylene, the amount of carbon monoxide injected is that which will provide a total pressure in the range of 50–3000 atmospheres at reaction temperature.

The reaction is conducted until there is no further pressure drop and this generally requires from 10–20 hours, although shorter or longer reaction times can be employed. Throughout the reaction period the pressure within the reactor is maintained by periodic injections of carbon monoxide.

The reaction between the dilactone and complementary polyfunctional reactant occurs at ordinary atmospheric pressures. The use of pressures in some instances is desirable either to reduce the time of reaction or to consolidate in one operation polymer formation and its conversion to a shaped object, e. g., a film.

As illustrated by the examples, the reaction between the dilactone and complementary reactant may be effected in the absence or in the presence of a liquid reaction medium. Suitable media are hydrocarbons, such as benzene, toluene, xylene, cyclohexane, isooctane; ethers, such as, dioxane, diethyl ether, etc.; halohydrocarbons, such as chloroform, and the like.

The reaction medium may be a solvent or a non-solvent for the dilactone or for the complementary reactant.

The amount of reaction medium is not critical and it may be just enough to wet the reactants or up to a hundred or more times the weight of the reactants.

The time and temperature of the reaction depend upon the nature of the complementary reactant. As illustrated by Example II with tetraethylenepentamine reaction occurs upon bringing the reactants together at ordinary room temperature. With less reactive reagents heat-treatment is required. As a rule reaction occurs at temperatures which can range from ordinary room temperature up to 250° C. Under these temperature conditions, the time of reaction can be from a few minutes up to 15 or more hours.

In some instances an after-treatment at elevated temperatures under reduced pressure is desirable to remove last traces of unreacted reactants and low molecular weight products.

The complementary reactant is generally used in amount which is at least equimolar to the dilactone. If desired, however, one or the other may be used in excess. When the complementary reactant is a liquid, it may be used in a large excess, in which event it functions both as a reactant and reaction medium. After reaction is complete, the excess may be removed by distillation or other methods known to those skilled in the art.

The polymers of this invention have thermosetting properties and are useful as components of printing ink compositions, or protective coatings for rigid substrates, such as steel and the like, as adhesives in the preparation of laminated structures such as plywood, as coatings for paper, especially for use as insulating material, as coatings for wires to be used in wiring for electric motors, and the like.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A polymeric reaction product of an unsaturated dilactone and an organic complementary polyfunctional reactant containing at least two groups selected from the class consisting of hydroxyl and primary and secondary amino groups, said unsaturated dilactone having one of the formulas

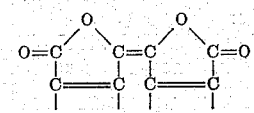

and

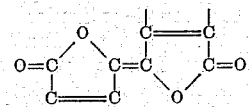

wherein one free valence of each ring in said formulas is satisfied by R and the other free valence of each ring in said formulas is satisfied by R', and R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms.

2. A polymeric reaction product as set forth in claim 1 wherein said organic complementary polyfunctional reactant is an organic polyhydroxy compound.

3. A polymeric reaction product as set forth in claim 1 wherein said organic complementary polyfunctional reactant is a glycol.

4. A polymeric reaction product as set forth in claim 1 wherein said organic complementary polyfunctional reactant is a polyamine wherein the amino nitrogens have at least one hydrogen attached thereto.

5. A polymeric reaction product as set forth in claim 1 wherein said organic complementary polyfunctional reactant is a diamine wherein the amino nitrogens have at least one hydrogen attached thereto.

6. A polymeric reaction product of [Δ²,²'(5H,5'H)-bifuran]-5,5'-dione and an organic complementary polyfunctional reactant containing at least two groups selected from the class consisting of hydroxyl and primary and secondary amino groups.

7. A polymeric reaction product of [Δ²,²'(5H,5'H)-bifuran]-5,5'-dione and an organic polyhydroxy compound.

8. A polymeric reaction product of [Δ²,²'(5H,5'H)-bifuran]-5,5'-dione and a glycol.

9. A polymeric reaction product of [Δ²,²'(5H,5'H)-bifuran]-5,5'-dione and ethylene alcohol.

10. A polymeric reaction product of [Δ²,²'(5H,5'H)-bifuran]-5,5'-dione and polyvinyl alcohol.

11. A polymeric reaction product of [Δ²,²'(5H,5'H)-bifuran]-5,5'-dione and a polyamine wherein the amino nitrogens have at least one hydrogen attached thereto.

12. A polymeric reaction product of [$\Delta^{2,2'(5H,5'H)}$-bifuran]-5,5'-dione and a diamine wherein the amino nitrogens have at least one hydrogen attached thereto.

13. A polymeric reaction product of [$\Delta^{2,2'(5H,5'H)}$-bifuran]-5,5'-dione and piperazine.

14. A polymeric reaction product of [$\Delta^{2,2'(5H,5'H)}$-bifuran]-5,5'-dione and hexamethylene-diamine.

15. A polymeric reaction product of [$\Delta^{2,2'(5H,5'H)}$-bifuran]-5,5'-dione and diethanolamine.

References Cited in the file of this patent

Van Natta et al.: J. Am. Chem. Soc. 56, 445 (1934). (Copy in Sci. Library.)